No. 716,150. Patented Dec. 16, 1902.
J. A. & F. L. TRAUT.
MEASURING RULE.
(Application filed Aug. 2, 1902.)
(No Model.)
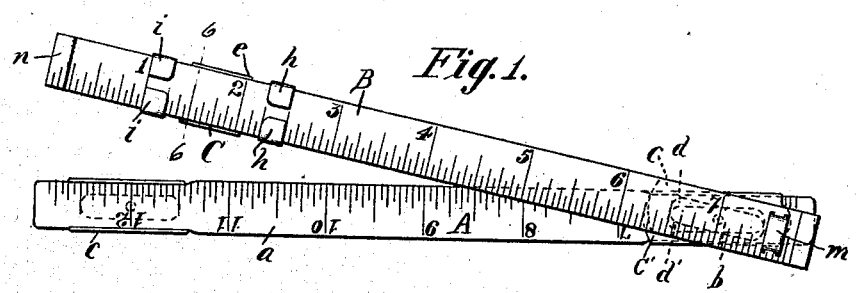
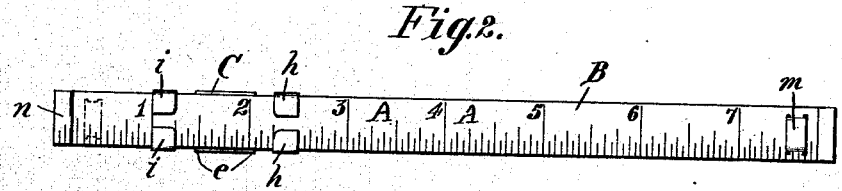
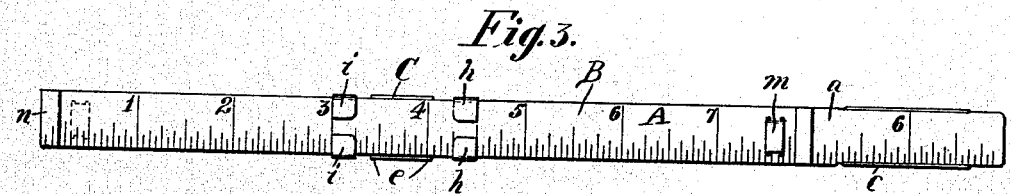
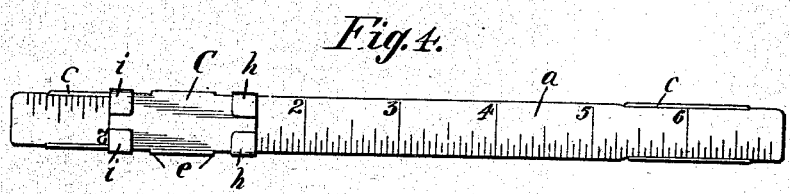
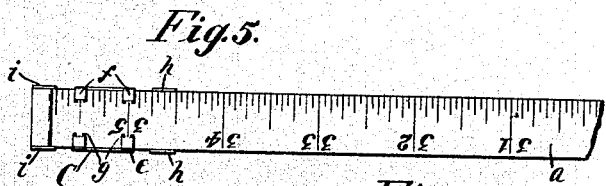
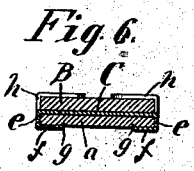
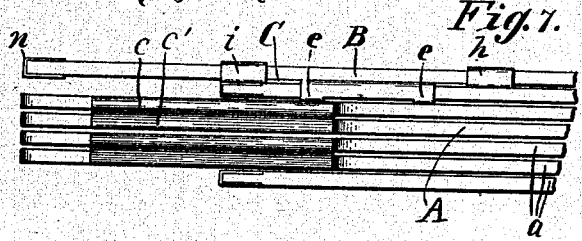
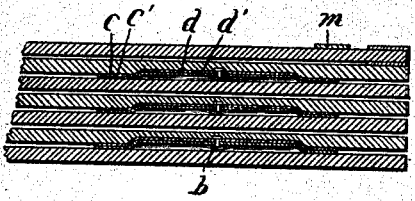
Witnesses:
F. G. Hachenburg.
R. W. Pittman
Inventors:
Justus A. Traut.
F. L. Traut.
By their Attorney.
F. H. Richards.
THE NORRIS PETERS CO., PHOTO-LITHO., WASHINGTON, D. C.

UNITED STATES PATENT OFFICE.

JUSTUS A. TRAUT AND FRANK L. TRAUT, OF NEW BRITAIN, CONNECTICUT.

MEASURING-RULE.

SPECIFICATION forming part of Letters Patent No. 716,150, dated December 16, 1902.

Application filed August 2, 1902. Serial No. 118,051. (No model.)

*To all whom it may concern:*

Be it known that we, JUSTUS A. TRAUT and FRANK L. TRAUT, citizens of the United States, residing at New Britain, in the county of Hartford and State of Connecticut, have invented certain new and useful Improvements in Measuring-Rules, of which the following is a specification.

This invention relates to measuring-rules; and it consists, substantially, in the improvements hereinafter particularly described.

Though applicable to measuring-rules of different kinds, the present improvements have reference more especially to that class or type of rules comprising a plurality of sections hinged or otherwise movably joined together and adapted to be turned outwardly one upon the other for the purpose of increasing the capacity of the rule for the different purposes for which the same is to be used. A rule of this character possesses decided advantages of construction and organization of parts; but in ascertaining or laying off measurements therewith it is frequently necessary to raise or shift the same from a determinate position on the object or work operated upon by which to alter the length of the rule commensurate with the measurements to be effected and which consumes considerable time, besides augmenting the labor attendant upon such operations.

One of the principal objects of the present invention is to overcome the above-mentioned disadvantages and to provide a rule of the character specified with means whereby the measuring capacity thereof may be altered without moving or shifting the rule upon the object or work being measured and also to increase the advantages of the rule and to render the same available under a greater number of conditions than hitherto.

A further object is to provide a rule having the qualities mentioned which is simple in the construction and organization of the several elements or parts thereof and one also which is cheap to manufacture, besides being easy of manipulation or handling.

The above and additional objects are attained by means substantially such as are indicated in the accompanying drawings, wherein—

Figure 1 is a view in perspective of a foldable rule with one of the outermost sections thereof turned partly outward and showing our present improvements as applied to said outwardly-turned section. Fig. 2 is a plan view showing a foldable rule embodying our improvements, said view indicating the appearance of the rule when all the sections thereof are closed one upon another. Fig. 3 is a similar view showing the manner of adjusting our improved supplementary rule-section by which to alter the measuring capacity of the rule without extending the foldable sections thereof. Fig. 4 is a plan view of our improved rule, (minus the supplementary slidable section thereof,) showing the construction of one form of guide which may be employed for the supplementary slidable section of our invention. Fig. 5 is a view of the inner or under side of the outermost main or foldable rule-section to which our present improvements are applied; and Fig. 6 is a transverse sectional view through the said outwardly-turned rule-section and its adjuncts, said view being taken on the line 6 6 of Fig. 1. Fig. 7 is a central longitudinal part-sectional view of the rule as shown in Fig. 2.

Before proceeding with a more detailed description it may be stated that our present improvements are applicable alike to measuring-rules comprising a single section only or a plurality of foldable sections, the latter form being the one preferably selected herein for the purposes of illustration of the improvements, it being understood that we are not limited in any respect whatever as to the particular character of joint employed for the rule-sections. In carrying our invention into effect we provide one of the outermost main or foldable sections of the rule with a supplementary section, which is mounted on said outermost foldable section so as to slide or be moved lengthwise or longitudinally thereof within certain limits, it being in this way that the measuring capacity of the rule may be altered or increased either when the main sections of the rule are folded together or closed or when any one or more of such sections are open or distended for use. We employ a specially-constructed guide for the supplementary section in the adjustments thereof upon the supporting main rule-section therefor, and suitable stops are provided for limiting the movements of the said supplementary section in either direction. The embodiment of our invention herein shown is exceedingly simple in construction and effective in use, as will hereinafter more fully appear, and it may be stated that the guide for the supplementary rule-section of our present improvements is so constructed in part as to constitute an index or indicator for enabling a ready determination of measurements to be had by the aid of said supplementary section.

Specific reference being had to the accompanying drawings by the designating characters marked thereon, A represents an ordinary measuring-rule comprising a plurality of movable or foldable sections $a$, united at the ends by means of any suitable joint $b$ to enable said sections to be either folded together or turned outwardly one upon another in the different uses to which the rule may be put. As herein shown, the movable joint for the rule-sections comprises a pair of swivel-plates $c\ c'$, applied to the adjacent faces of the sections at the ends, one plate of each pair being formed with a longitudinal recess or depression $d$, receiving a corresponding projection $d'$ on the other plate in both the open and closed positions of the said sections. The said rule-sections are each provided with a scale divided into inches, with the usual subdivisions thereof, as shown, each section being of length somewhat in excess of the actual maximum measuring capacity thereof by which to allow for the overlapping of the sections at the rule-joints, as is apparent; but instead of rounding off or convexing the ends of the rule-sections, as has frequently been done heretofore, we square the said ends, so as to enable the same to serve as a working abutment in many instances of use of the rule. It is frequently desirable to employ a measuring-rule of this general character for the purpose of effecting measurements of lengths considerably within the maximum measuring capacity of the rule; but in order to effect such measurements it is necessary very often to move or shift the rule from a previously-fixed relationship thereof with some object by which to enable the rule-sections to be turned or extended, and this occasions the loss of considerable time, besides seriously interfering with the calculations of the artisan or workman using the rule. To overcome this difficulty and objection, we provide one of the outermost of the movable or foldable main sections $a$ of the rule with a longitudinally slidable or adjustable supplementary rule-section B, which is also provided with a scale divided into inches, with the usual subdivisions thereof, as shown, suitable means being employed for guiding said supplementary section and maintaining it in its proper relationship with the main rule-sections. Preferably we provide the outer surface of one of the outermost main rule-sections with a guide C, located at the free end thereof and comprising a thin oblong plate formed with downturned portions $e$ at the side edges thereof to snugly fit the adjacent recessed portions of the corresponding edges of the outermost main rule-section, as shown, and also having clips $f$ turned against the under side of said outermost section, said clips being preferably pointed or formed with barbs or spurs $g$, which enter the material of the section. (See Fig. 6.) In this way the guide C is securely held in place, as is apparent, and it will be observed that the said guide is also provided at the ends with pairs of inturned spring lugs or members $h\ h$ and $i\ i$, standing upwardly from the plate at the side edges thereof to a height sufficient to permit passage or movement thereunder of the supplementary rule-section B in the longitudinal adjustments of the latter, said spring lugs or members exerting a clamping-pressure on said supplementary rule-section sufficient to maintain the latter in the different positions to which it may be moved. As shown in the drawings, the supplementary longitudinally-extensible rule-section B is preferably provided near one end thereof on its outer surface with a small projection or raised plate $m$, which constitutes a stop for engaging the spring-lugs $h\ h$ and limiting the movement of the supplementary section in one direction, the tip $n$ at the other end of said supplementary section serving in a similar capacity for limiting the movement of the section in the other direction by engaging or coming into contact with the edges of said spring-lugs $i\ i$, it being apparent, of course, that other forms of stops could be employed, if desired, and that their use may be altogether dispensed with also, if desired. It will be observed that the inner edges of the spring guides or members $h\ h$ and $i\ i$ are practically one inch apart, although this is not absolutely essential, and that either one or either pair of such guides or members may be utilized as an index or indicator for determining measurements from the divisions of the scale on the said supplementary rule-section with which said guides or members coöperate. Assuming that all the rule-sections were in closed position and it was desirable to obtain the measurement of an object or piece of work which on placing the folded rule thereon was found to be an inch or more in excess of the measuring capacity of the rule while thus folded, it would then be simply necessary to slide the supplementary section B outwardly sufficiently far for the purpose, whereupon the desired measurement could be readily ascertained in a manner quite obvious. Our said improvements are also effective in like manner in similar instances where one or more of the plurality of foldable main rule-sections are in open position in the first instance, and it is thought the advantages of our improvements will be apparent. A rule thus constructed may also be employed as a gage for various kinds of work, in which case the folded sections would constitute an abutment at one end, while the longitudinally-extensible supplementary section B would constitute the graduated stock of the gage. The employment of the said supplementary section B also renders the rule capable of use for many kinds of "inside" work for which this particular form of rule has hitherto not been adapted. It is of course apparent that we are not limited to the precise details of construction and organization of the several parts or elements herein shown and described, since departures therefrom may be adopted and still come within the scope of our invention.

While we have herein referred to the rule-tip $n$ as serving the capacity of stop for limiting the movement of the supplementary section B in one direction, we may, if desired, employ for such purpose a stop similar to the stop $m$, as indicated in dotted lines, Figs. 2 and 3.

Having described our invention, we claim—

1. A measuring-rule comprising a plurality of main sections movably joined together near the ends and adapted to be turned one upon another in planes substantially parallel with the operative faces thereof, an outermost one of said sections being provided on the outer face thereof with a guide, and a supplementary section slidable or adjustable longitudinally in the guide; said guide consisting of a plate bent to fit portions of the longer edges of said outermost main section, and further bent against the inner face of the latter and having securing-barbs entering such face, the said plate being also formed with outstanding inturned members overlapping the longer edges of said supplementary section.

2. A measuring-rule comprising a plurality of main sections movably joined together near the ends and adapted to be turned one upon another in planes substantially parallel with the operative faces thereof, an outermost one of said sections being provided on the outer face thereof with a guide, a supplementary section slidable or adjustable longitudinally in the guide, and means for limiting the movement of the supplementary section in either direction; said guide consisting of a plate bent to fit portions of the longer edges of the said outermost main section, and further bent against the inner face of the latter and having securing-barbs entering such face, the said plate being also formed with outstanding inturned members overlapping the longer edges of the supplementary section.

3. A measuring-rule comprising a plurality of main sections movably joined together near the ends and adapted to be turned one upon another in planes substantially parallel with the operative faces thereof, an outermost one of said sections being provided on the outer face thereof with a guide, and a supplementary section slidable or adjustable longitudinally in the guide; said guide consisting of a plate bent to fit portions of the longer edges of said outermost main section, and further bent against the inner face of the latter and having securing-barbs entering such face, the said plate being also formed with outstanding inturned members overlapping the longer edges of the supplementary section, and this latter section being provided with stops adapted to engage the ends of the guide, substantially as shown and for the purpose described.

4. A measuring-rule comprising a plurality of main sections movably joined together near the ends and adapted to be turned one upon another in planes substantially parallel with the operative faces thereof, an outermost one of said main sections being provided on the outer face thereof with a guide, and a supplementary section slidable or adjustable longitudinally in the guide; said guide consisting of a plate bent to fit portions of the longer edges of the said outermost main section, and further bent against the inner face of the latter and having securing-barbs entering such face, the said plate being also formed with outstanding inturned members overlapping the longer edges of the supplementary section and exerting a yielding pressure thereon.

5. A measuring-rule comprising a plurality of main sections movably joined together near the ends and adapted to be turned one upon another in planes substantially parallel with the operative faces thereof, an outermost one of said sections being provided on the outer face thereof with a guide, and a supplementary section slidable or adjustable longitudinally in the guide; said guide consisting of a plate bent to fit portions of the longer edges of the said outermost main section, and further bent against the inner face of the latter and having securing-barbs entering such face, the said plate being also formed with outstanding inturned members overlapping the longer edges of the said supplementary section, and this latter section being provided with plates for engaging the ends of the guide, substantially as shown and for the purpose set forth.

JUSTUS A. TRAUT.
FRANK L. TRAUT.

Witnesses:
EBEN STRONG,
EDDY N. SMITH.